United States Patent
Chen et al.

(10) Patent No.: US 11,166,301 B2
(45) Date of Patent: Nov. 2, 2021

(54) METHODS AND SYSTEMS FOR RESOURCE CONFIGURATION OF GRANT-FREE (GF)TRANSMISSIONS USING RADIO RESOURCE CONTROL (RRC) SIGNAL

(71) Applicant: Huawei Technologies Co., Ltd., Shenzhen (CN)

(72) Inventors: Yan Chen, Shanghai (CN); Yi Wang, Shanghai (CN); Yinggang Du, Shenzhen (CN); Xiuqiang Xu, Shanghai (CN); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 16/557,060

(22) Filed: Aug. 30, 2019

(65) Prior Publication Data

US 2020/0015260 A1  Jan. 9, 2020

Related U.S. Application Data

(63) Continuation of application No. PCT/CN2018/081811, filed on Apr. 4, 2018.
(Continued)

(51) Int. Cl.
*H04W 72/12* (2009.01)
*H04W 76/27* (2018.01)
*H04W 72/04* (2009.01)

(52) U.S. Cl.
CPC ..... *H04W 72/1284* (2013.01); *H04W 72/042* (2013.01); *H04W 72/0493* (2013.01); *H04W 76/27* (2018.02)

(58) Field of Classification Search
CPC ............. H04W 72/1284; H04W 76/27; H04W 72/042; H04W 72/0493; H04W 72/1268; H04W 74/08
See application file for complete search history.

(56) References Cited

U.S. PATENT DOCUMENTS

2016/0242082 A1  8/2016 Jung et al.
2017/0230997 A1*  8/2017 Damnjanovic ....... H04W 28/26
(Continued)

FOREIGN PATENT DOCUMENTS

| CN | 105284172 A | 1/2016 |
| CN | 106507486 A | 3/2017 |
| CN | 106507497 A | 3/2017 |

OTHER PUBLICATIONS

U.S. Appl. No. 62/443,464, filed Jan. 6, 2017.*
(Continued)

*Primary Examiner* — Ian N Moore
*Assistant Examiner* — Rushil Parimal Sampat
(74) *Attorney, Agent, or Firm* — Slater Matsil, LLP

(57) ABSTRACT

Methods and systems for dynamically activate and deactivate an allocated resource for a UE to make grant-free uplink transmission are provided. In one embodiment, a user equipment (UE) receives a Radio Resource Control (RRC) signal. The RRC signal specifies grant-free (GF) configuration information. The GF configuration information comprises an activation field and at least one other GF resource configuration field. The activation field indicates whether the UE may perform GF uplink (UL) transmissions without waiting for a downlink control information (DCI) message. Then, the UE performs a GF UL transmission in accordance with the GF configuration information in the RRC signal.

15 Claims, 9 Drawing Sheets

Related U.S. Application Data

(60) Provisional application No. 62/483,166, filed on Apr. 7, 2017.

(56)  References Cited

U.S. PATENT DOCUMENTS

| | | | |
|---|---|---|---|
| 2018/0035459 A1* | 2/2018 | Islam | H04W 74/04 |
| 2018/0199334 A1* | 7/2018 | Ying | H04W 72/0413 |
| 2018/0199381 A1 | 7/2018 | Rong et al. | |
| 2018/0332566 A1* | 11/2018 | You | H04L 1/0091 |

OTHER PUBLICATIONS

Huawei, et al., "UL Grant-free transmission", 3GPP TSG RAN WG1, Meeting #88, R1-1701665, Feb. 13-17, 2017, 15 Pages, Athens, Greece.

ZTE, et al., "Basic Grant-free Transmission for URLLC", 3GPP TSG RAN WG1 Meeting #88, R1-1701594, Feb. 13-17, 2017, 8 Pages, Athens, Greece.

LG Electronics, "General procedures for grant-free/grant-based MA", 3GPP TAG RAN WG1 Meeting #86bis, R1-1609228, Oct. 10-14, 2016, 3 Pages, Lisbon, Portugal.

Nokia, et al., "Contention-based grant-free transmission for URLLC", 3GPP TSG-RAN WG1 NR AH, R1-1701026, Jan. 16-20, 2017, 6 Pages, Spokane, WA, USA.

Huawei et al., "Grant Free transmission for UL URLLC," 3GPP TSG RAN WG1 Meeting #88b, R1-1704222, Apr. 3-7, 2017, 7 pages, Spokane, USA.

* cited by examiner

METHODS AND SYSTEMS FOR RESOURCE CONFIGURATION OF GRANT-FREE (GF)TRANSMISSIONS USING RADIO RESOURCE CONTROL (RRC) SIGNAL

CROSS-REFERENCE TO RELATED APPLICATIONS

This patent application is a continuation of PCT Application No. PCT/CN2018/081811, filed on Apr. 4, 2018 and entitled "Methods and Systems for Resource Configuration of Wireless Communication Systems," which claims priority of U.S. Provisional Application No. 62/483,166, filed on Apr. 7, 2017 and entitled "Methods and Systems for Resource Configuration of Wireless Communication Systems," applications of which are hereby incorporated by reference herein as if reproduced in their entireties.

TECHNICAL FIELD

The present disclosure relates to a system and method for activating or deactivating allocated grant-free resource for a wireless communication system.

BACKGROUND

In some wireless communication systems, a user equipment (UE) wirelessly communicates with a base station (BS) to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency division multiple access (OFDMA) frame.

Recently, a grant-free uplink transmission scheme has been developed in which UEs may send uplink transmissions using certain uplink resources shared by the UEs or semi-statically allocated to the UEs, without specifically requesting use of the resources and without specifically being dynamically granted the resources by the base station.

SUMMARY

A method and system for a base station for activating or deactivating allocated semi-static resource(s) for a UE are provided.

In a first aspect, an embodiment method of resource configuration in wireless communications is provided, the method including activating or deactivating, by a base station, a semi-static resource for a UE for uplink grant free transmission, with higher layer signaling and layer 1 signaling. With this method, the UE can have more flexibility to use the allocated the grant free resources. The resource efficiency can also be improved.

In a first implementation form of the method of the first aspect, in the higher layer signaling, there is an activating/deactivating field.

In a second implementation form of the method of the first aspect, the activating/deactivating field is 1 bit for N resources allocated to the UE, where N>=1 and N is an integer, to show the N resources to be activated or deactivated.

In a third implementation form of the method of the first aspect, the activating/deactivating field is N bit for N resource allocated to the UE, wherein each bit corresponding to one of the resource to show this resource is activated or deactivated, where N>=1 and N is an integer.

In a fourth implementation form of the method of the first aspect, the activating/deactivating field is a specific field or time shared with other field.

In a fifth implementation form of the method of the first aspect, in the layer 1 signaling, there is an activating/deactivating field.

In a sixth implementation form of the method of the first aspect, the activating/deactivating field is 1 bit for N resource allocated to the UE, where N>=1 and N is an integer, to show the N resources to be activated or deactivated.

In a seventh implementation form of the method of the first aspect, the activating/deactivating field includes N bits for N resource allocated to the UE, wherein each bit corresponding to one of the resource to show this resource is activated or deactivated, where N>=1 and N is an integer.

In an eighth implementation form of the method of the first aspect, the activating/deactivating field is a specific field or time shared with other field.

In a ninth implementation form of the method of the first aspect, the method comprises resource configuration update based on the content in the activating/deactivating field.

In a tenth implementation form of the method of the first aspect, if a resource is activated as indicated by the activating/deactivating field, the content in other fields of the layer 1 signaling applies to the activated resource.

In an eleventh implementation form of the method of the first aspect, if a resource is activated as indicated by the activating/deactivating field, the content in other fields of the layer 1 signaling applies to all resources allocated to the UE.

In a twelfth implementation form of the method of the first aspect, if a resource is activated as indicated by the activating/deactivating field and the time/frequency information in the layer 1 signaling is same as the activated resources, the content in other fields of the layer 1 signaling applies to the activated resource.

In a thirteenth implementation form of the method of the first aspect, in the case the L1 signaling is only used for activation/deactivation of the semi-static configured resource, the other field in the L1 signaling can be set to a default value such as all "0"s to avoid misunderstanding of the resource information In a second aspect, an embodiment base station to implement the method for activating or deactivating allocated grant free resource(s) for a UE in the first aspect is provided.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

A grant-free (GF) uplink transmission scheme allows UEs to perform uplink transmissions using resources shared by the UEs, without the UEs having to specifically requesting use of the resources from the base station. The GF resources may be allocated by Radio Resource Control (RRC) signaling. It can be technically challenging to indicate to a UE when the allocated resources are available for the UE to use for GF uplink transmissions. One approach would be always using separate Downlink Control Information (DCI) signaling to notify the UE that one or more of the GF resources, allocated previously by RRC signaling, are activated for the UE to immediately use for GF uplink transmissions. Embodiments in this disclosure provide further improvement over such approach. In some embodiments, the base station may send an RRC signal to inform a UE the allocated resources and whether the allocated resources are available for immediate use by the UE for GF uplink transmissions. The RRC signal may include a specific activation field to indicate whether the allocated resources can be immediately used. The specific activation field may be shared with one or more other GF resource configuration fields in the RRC signal. For example, the presence or absence of the one or more other GF resource configuration fields in the RRC signal may indicate shared information of what resources are allocated and whether the allocated resources are immediately available for use. In another embodiment, the specific activation field may be a separate field (a bit or a bit map) in addition to the one or more other GF resource configuration fields in the RRC signal. When the specific activation field indicates that one or more allocated resources are activated, the UE may immediately use the activated one or more resources to perform a GF uplink transmission, without waiting for any DCI message. That is, there is not any intervening DCI message between the RRC signal and the GF uplink transmission. When the specific activation field indicates that none of allocated resources is activated, then the UE needs to wait for a DCI message for resource activation. In so doing, embodiment techniques of using the RRC signals improve the performance of wireless transmissions and efficient utilization of network resources. The use of DCI messages provides additional flexibility for resource allocation and activation.

The making and using of embodiments of this disclosure are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
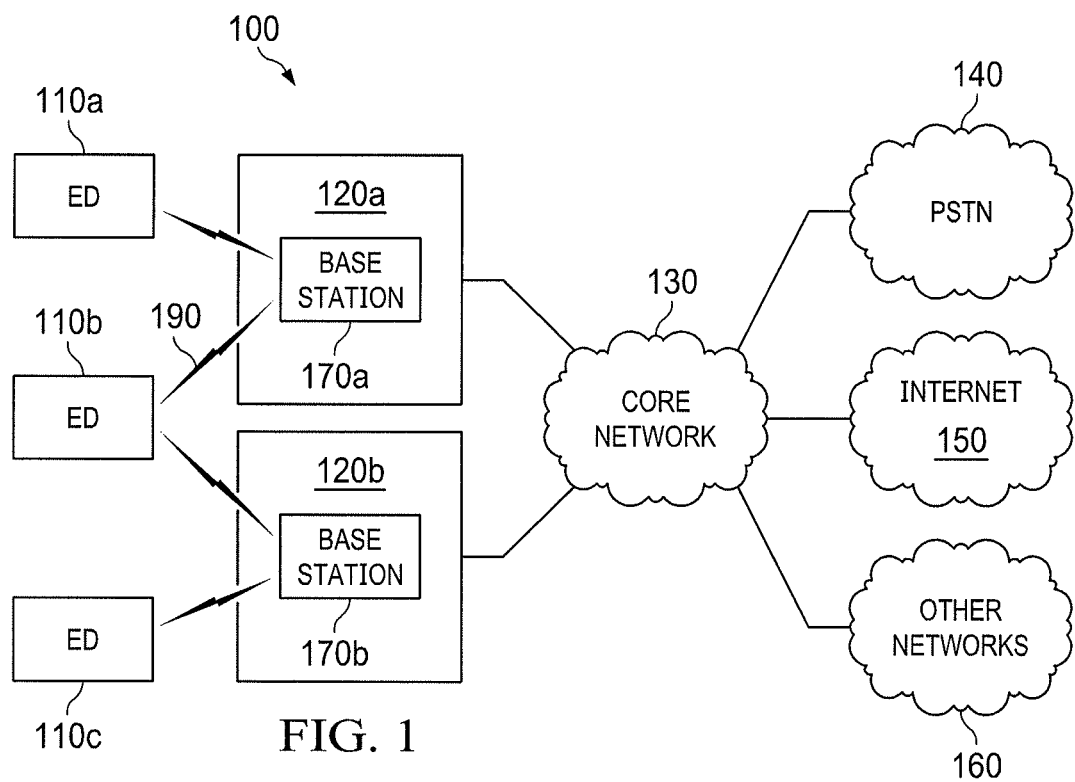
FIG. 1 shows a communication system.

FIG. 1 illustrates an example communication system 100. In general, the system 100 enables multiple wireless or wired users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, or a transmit-receive point (TRP). The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet iso, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
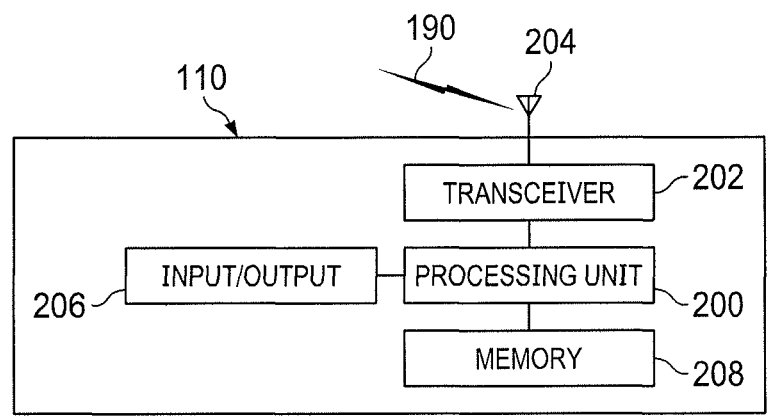
FIG. 2A shows an exemplary wireless communication device.
Figure 2B:
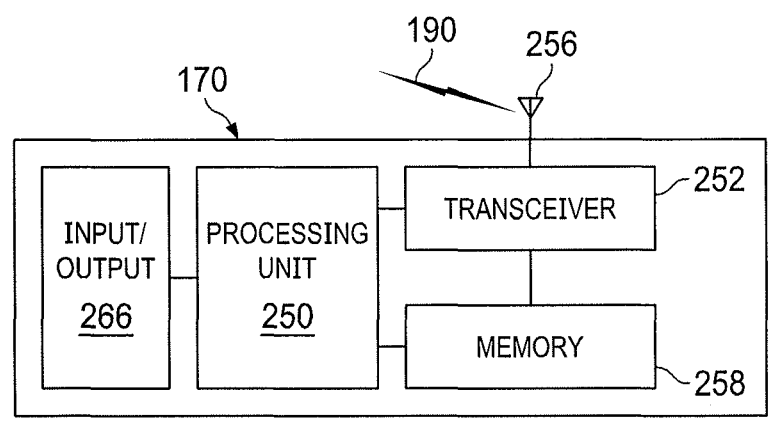
FIG. 2B shows an exemplary base station.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receiver could be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Please note that in both EDs like FIG. 2A or base stations like FIG. 2B, memory can be integrated to processing unit when the processing unit are implemented by hardware, such as using integrated circuits or logic circuits.

To enable a UE to make grant-free (GF) transmission, semi-static resource configuration may be sent to a UE through higher layer signaling such as Radio Resource Control (RRC) signaling for a pool of resources for each transmit interval. The UE may select at least one resource to make GF transmission if needed. Each resource includes a time and frequency domain resource, associated with at least one reference signal (RS), one modulation and coding scheme (MCS), one set of power control parameters, and potentially a hopping pattern. Each UE can also be configured with a repetition number K. However, sometimes, the allocated resource cannot be activated immediately owing to, e.g., system requirement or service requirement or any other reason. And sometimes the allocated resource may be deactivated for a certain period owing to, e.g., system load or any other reason.

One or more embodiments provide a scheme for activating or deactivating one or more semi-static resource allocated to a UE for its uplink transmission. One embodiment adds a field in semi-static resource configuration to contain information about whether each of the resource needs extra layer one (L1) signaling to be activated to use or not, e.g., through bit map indication. Also, the L1 signaling can contain some changes for a part of the parameters in the resources.

In the following, the application and the UE/BS procedures therein can be elaborated with examples with different numbers of semi-statically configured resources and different numbers of resources that are set to wait for activation via L1 signaling, such as Downlink Control Information (DCI).

Note that the DCI for this purpose (activation/deactivation/reconfiguration of the resource) can have a separate Radio Network Temporary Identifier (RNTI) other than Cell RNTI (C-RNTI) scrambled, so that it can be distinguished from the DCI for general grant-based transmission in a faster way to save detection latency.

One embodiment to implement the scheme adds a field in an RRC signaling, which is used to allocate the semi-static resource to a UE, and to indicate whether the allocated resource can be activated immediately or needs to be activated by a L1 signaling (such as DCI). This new activation/deactivation field can be a specific field (1 bit) or can be time shared with other information.

As an example, if a UE is semi-statically configured (such as through RRC configuration) with only 1 GF resource per transmit interval, 1 bit field SEMI-STATIC-ACTIVATED is added in the semi-static resource configuration to indicate whether this resource can be directly used after semi-static resource configuration (i.e., activated) or needs further activation via L1 signaling such as DCI. This new activation/deactivation field can be a specific field (1 bit) or can be time shared with other information.

If SEMI-STATIC-ACTIVATED=1 (or "Yes," or "activated"), then the UE can directly use the resource for transmission.

If SEMI-STATIC-ACTIVATED=0 (or "No," or "deactivated"), then the UE cannot directly use the resource for transmission but needs to wait for a L1 signaling (such as in DCI) to activate this resource.

Correspondingly, there is a 1 bit region L1-ACTIVATED added in the DCI, which may reuse some of the current DCI format but add/change the meaning of 1 bit in the existing region to indicate whether the resource for the UE is activated or not from the given time instance on, or even shared with some other indications in DCI in a time-sharing way. There are different combinations of SEMI-STATIC-ACTIVATED and L1-ACTIVATED.

If SEMI-STATIC-ACTIVATED=1 (or "Yes," or "activated") and L1-ACTIVATED=1 (or "Yes"), then the UE can continue using the resource for transmission.

If SEMI-STATIC-ACTIVATED=1 (or "Yes," or "activated") and L1-ACTIVATED=0 (or "No"), then the semi-static configured resource is deactivated for this UE from the time on (until the next activation signal), and the UE stops using the resource for transmission.

If SEMI-STATIC-ACTIVATED=0 (or "No," or "deactivated") and L1-ACTIVATED=1 (or "Yes"), then the semi-static configured resource is activated and the UE can use the resource for transmission;

If SEMI-STATIC-ACTIVATED=0 (or "No," or "deactivated") and L1-ACTIVATED=0 (or "No"), then the UE is still not allowed to use the resource for transmission.

In the case where the L1 signaling is only used for activation/deactivation of the semi-static configured resource, the other field in the L1 signaling can be set to a default value such as all "0"s to avoid misunderstanding of the resource information.

It is also possible to change some parameters associated with the resource with the L1 activation/deactivation signaling. In this case, no matter the value of L1-ACTIVATED is, the rest of the field can indicate the resource reconfiguration.

For instance, the MCS associated resource can be changed with a new value indicated.

The power control parameters can be changed with a new set of values indicated.

The repetition number K can be changed with a new value indicated.

The frequency and/or time domain resource can be changed with new values indicated.

For the parameters that do not need to be changed, a default value (such as "0") or the original value configured by semi-static configuration can be used to avoid misunderstanding.

As another example, if a UE is semi-statically configured (such as through RRC configuration) with N GF resources per transmit interval, these N GF resources are jointly activated or deactivated, so only 1 bit region SEMI-STATIC-ACTIVATED is added in the semi-static resource configuration to indicate whether the N resources can be directly used after semi-static resource configuration or need further activation via L1 signaling such as DCI. This new field can be a specific field or can be time shared with other information.

If SEMI-STATIC-ACTIVATED=1 (or "Yes," or "activated"), then the UE can directly use the N resources for transmission. Please note that some rules about how the UE should use the N resources can be further defined. One simple example is to allow random selection of the resources, while another example is to use the resources by some pre-defined order specified explicitly or calculated from some formula;

If SEMI-STATIC-ACTIVATED=0 (or "No," or "deactivated"), then the UE cannot directly use the resources for transmission but needs to wait for a L1 signaling (such as in DCI) to activate the resources.

Correspondingly, there is a 1 bit region L1-ACTIVATED added in the DCI, which may reuse some of the current DCI format but add/change the meaning of 1 bit in the existing region to indicate whether the resources for the UE may be activated or not from the given time instance on, or even shared with some other indications in DCI in a time-sharing way. There are different combinations of SEMI-STATIC-ACTIVATED and L1-ACTIVATED.

If SEMI-STATIC-ACTIVATED=1 (or "Yes," or "activated") and L1-ACTIVATED=1 (or "Yes," or "activated"), then the UE can continue using the resources for transmission.

If SEMI-STATIC-ACTIVATED=1 (or "Yes," or "activated") and L1-ACTIVATED=0 (or "No," or "deactivated"), then the semi-static configured resources may be deactivated for this UE from the time on (until the next activation signal), and the UE stops using the resources for transmission.

If SEMI-STATIC-ACTIVATED=0 (or "No," or "deactivated") and L1-ACTIVATED=1 (or "Yes," or "activated"), then the semi-static configured resources may be activated and the UE can use the resources for transmission;

If SEMI-STATIC-ACTIVATED=0 (or "No," or "deactivated") and L1-ACTIVATED=0 (or "No," or "deactivated"), then the UE is still not allowed to use the resources for transmission.

In the case the L1 signaling is only used for activation/deactivation of the semi-static configured resources, the other field in the L1 signaling can be set to a default value such as all "0"s to avoid misunderstanding of the resource information.

It is also possible to change some parameters associated with the resources with the L1 activation/deactivation signaling. In this case, no matter the value of L1-ACTIVATED is, the rest of the field can indicate the resource re-configuration.

For instance, the MCS associated resources can be changed with a new value indicated.

The power control parameters can be changed with a new set of values indicated.

The repetition number K can be changed with a new value indicated.

The frequency and/or time domain resources can be changed with new values indicated Since the N resources are jointly activated or deactivated, the changes of parameters apply to all of the resources.

For the parameters that do not need to be changed, a default value (such as "0") or the original value configured by semi-static configuration can be used to avoid misunderstanding.

In another embodiment, one UE is allocated N semi-statically configured resources per transmit interval and these N resources can be activated or updated separately.

If a UE is semi-statically configured (such as through RRC configuration) with N GF resources per transmit interval, these N GF resources can be activated or deactivated separately, so a N-bit region SEMI-STATIC-ACTIVATED is added in the semi-static resource configuration to indicate whether each of the N resources can be directly used after semi-static resource configuration or need further activation via L1 signaling such as DCI. Following are some examples assuming N=4 (4 resources).

Figure 3A:
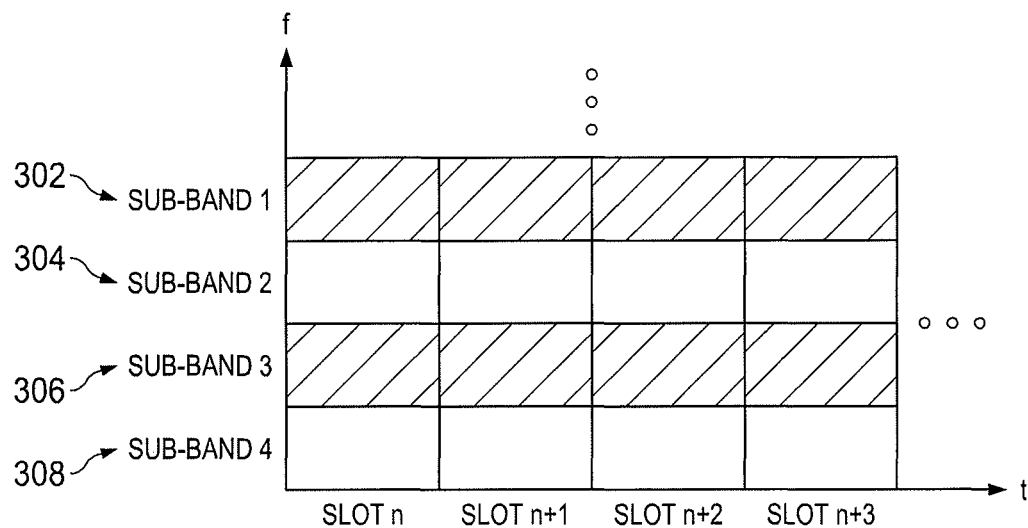
FIG. 3A shows an exemplary embodiment of N=4 resources configured semi-statically.

If SEMI-STATIC-ACTIVATED=[1, 0, 1, 0], then the UE could direct use the first and the third resources, but not the second and fourth resources. The latter two resources need further L1 signaling to activate, as shown in FIG. 3A. FIG. 3A shows that 4 GF resources may be jointly configured with no hopping. In FIG. 3A, one GF resource may be 1 sub-band intersecting 1 time slot. In FIG. 3A, a total of 4 sub-bands 302, 304, 306, and 308 are configured semi-statically such as through RRC signaling, but only sub-bands 302 and 306 can be directly used form grant-free transmissions. Sub-bands 304 and 308 cannot be used before being activated by L1 signaling such as DCI.

Figure 3B:
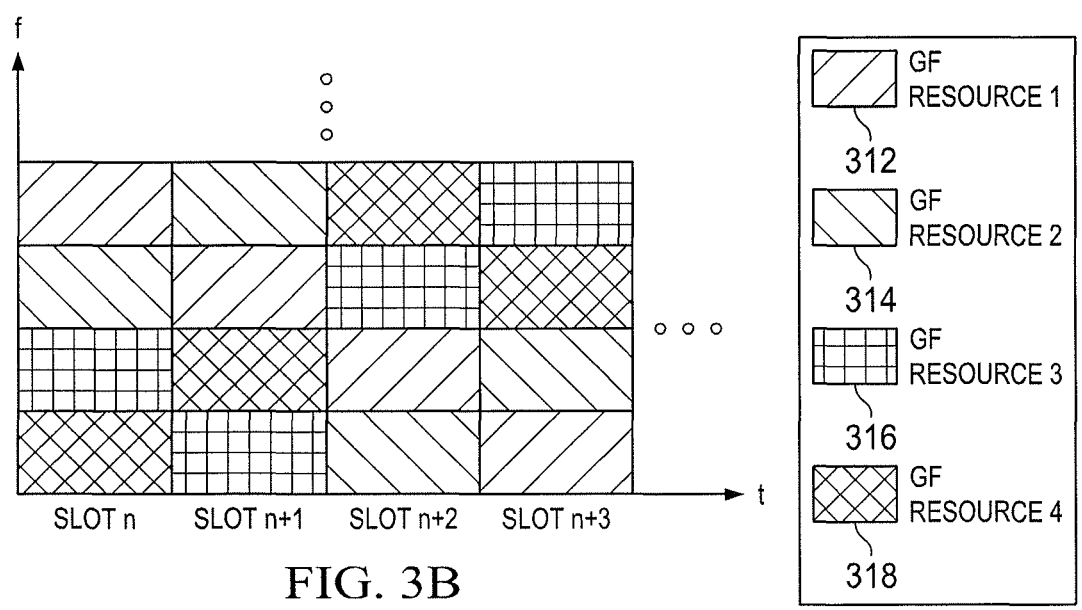
FIG. 3B shows an exemplary embodiment of N=4 resources configured semi-statically.

If SEMI-STATIC-ACTIVATED=[1, 1, 0, 0], then the UE could direct use the first and the second resources, but not the third and fourth resources. The latter two resources need further L1 signaling to activate, as shown in FIG. 3B. In FIG. 3B, some hopping pattern is defined over the time/frequency resources. In FIG. 3B, a total of 4 GF resources 312, 314, 316, and 318 with different hopping patterns are configured by RRC signaling, but only GF resources 312 and 314 can be directly used for grant-free transmissions. GF resources 316 and 318 are reserved and cannot be used before being activated by DCI.

Note that some rules about how the UE should use the resources can be further defined. One simple example is to allow random selection of the resources, while another example is to use the resources by some pre-defined order specified explicitly or calculated from some formula.

Correspondingly, there is a N-bit region L1-ACTIVATED added in the DCI, which may reuse some of the current DCI format but add/change the meaning of the N bits in the existing region to indicate whether the resources for the UE may be activated or not from the given time instance on, or even shared with some other indications in DCI in a time-sharing way. There are different combinations of SEMI-STATIC-ACTIVATED and L1-ACTIVATED.

Figure 4A:
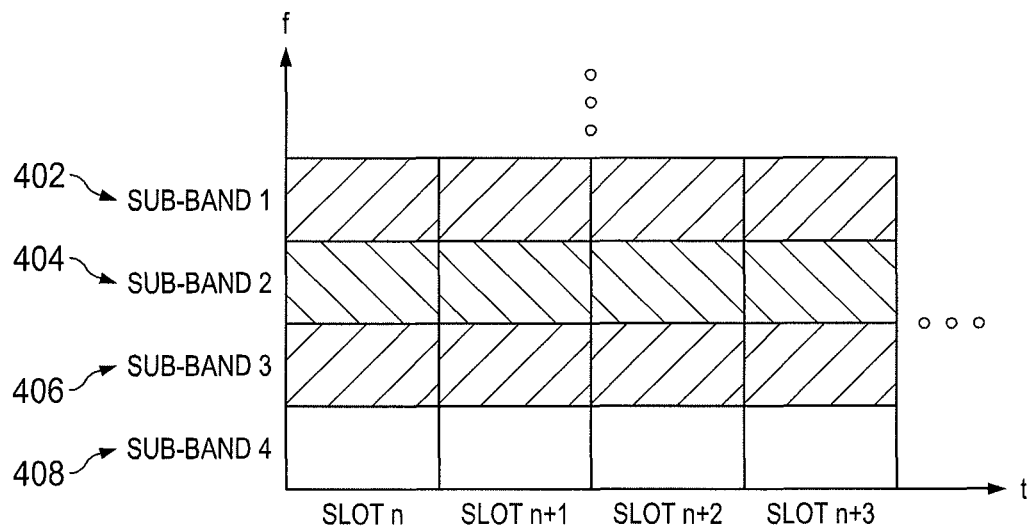
FIG. 4A shows an exemplary embodiment of activating one more resource configured semi-statically.

If SEMI-STATIC-ACTIVATED=[1, 0, 1, 0] and L1-ACTIVATED=[1, 1, 1, 0], then besides the two semi-statically activated resources 1 and 3, the second resource is activated by DCI. FIG. 4A illustrates an example of this scenario. FIG. 4A shows that 4 GF resources may be jointly configured with no hopping. In FIG. 4A, one GF resource may be 1 sub-band intersecting 1 time slot. In FIG. 4A, a total of 4 sub-bands 402, 404, 406, and 408 are configured semi-statically such as through RRC signaling, but only sub-bands 402 and 406 can be directly used for grant-free transmissions. In the case of heavy load, the base station (e.g., a gNB) sends DCI to activate sub-band 404 for grant-free transmissions. Sub-band 408 is still reserved.

Figure 4B:
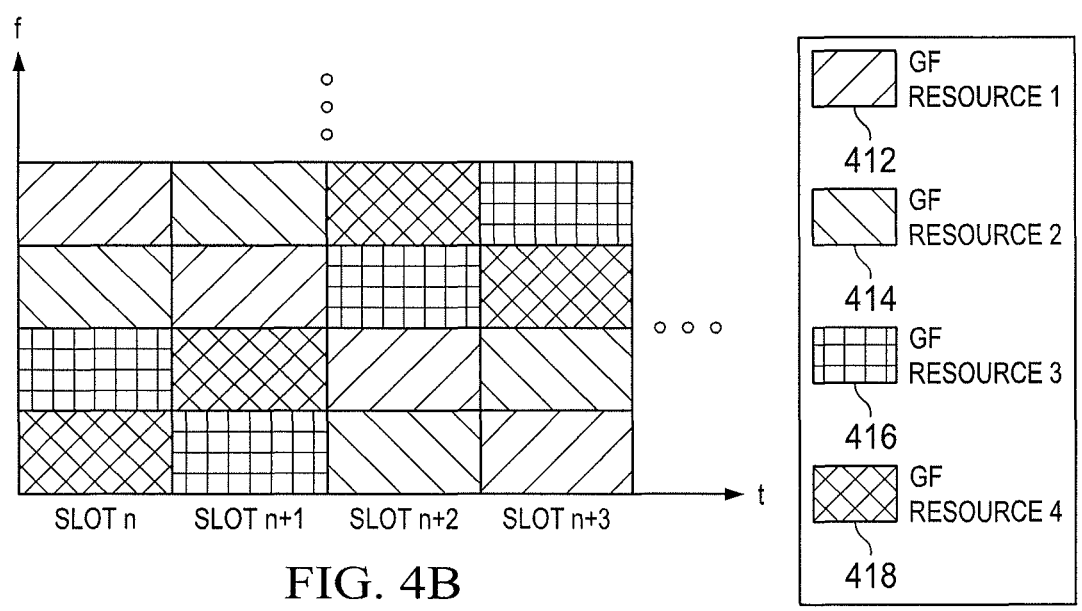
FIG. 4B shows an exemplary embodiment of activating one more resource configured semi-statically.

If SEMI-STATIC-ACTIVATED=[1, 0, 1, 0] and L1-ACTIVATED=[1, 1, 1, 0], then besides the two semi-statically activated resources 1 and 3, the second resource is activated by DCI. FIG. 4B provides an example of the scenario with hopping patterns defined. In FIG. 4B, a total of 4 GF resources 412, 414, 416, and 418 with different hopping patterns are configured by RRC signaling, but only GF resources 412 and 416 can be directly used for grant-free transmissions. In the case of heavy load, the base station (e.g., a gNB) sends DCI to activate sub-band 414 for grant-free transmissions. Sub-band 418 is still reserved.

Figure 5A:
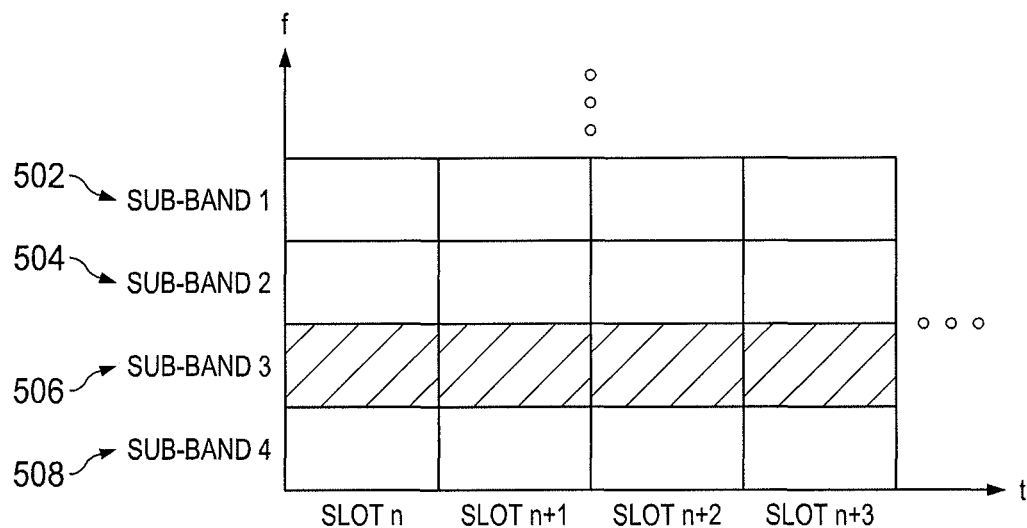
FIG. 5A shows an exemplary embodiment of deactivating one resource configured semi-statically.

If SEMI-STATIC-ACTIVATED=[1, 0, 1, 0] and L1-ACTIVATED=[0, 0, 1, 0], then resource 1 that is semi-statically activated is now dynamically deactivated, leaving only the third resource for transmission. FIG. 5A illustrates an example of the scenario. FIG. 5A shows that 4 GF resources may be jointly configured with no hopping. In FIG. 5A, one GF resource may be 1 sub-band intersecting 1 time slot. In FIG. 5A, a total of 4 sub-bands 502, 504, 506, and 508 are configured semi-statically such as through RRC signaling, but only sub-bands 502 and 506 can be directly used form grant-free transmissions. In the case of light load, the base station (e.g., a gNB) sends DCI to deactivate sub-band 502. After the DCI, only sub-band 506 can be used for grant-free transmissions. Sub-bands 502, 504, and 508 are reserved and cannot be used for grant-free transmissions.

Figure 5B:
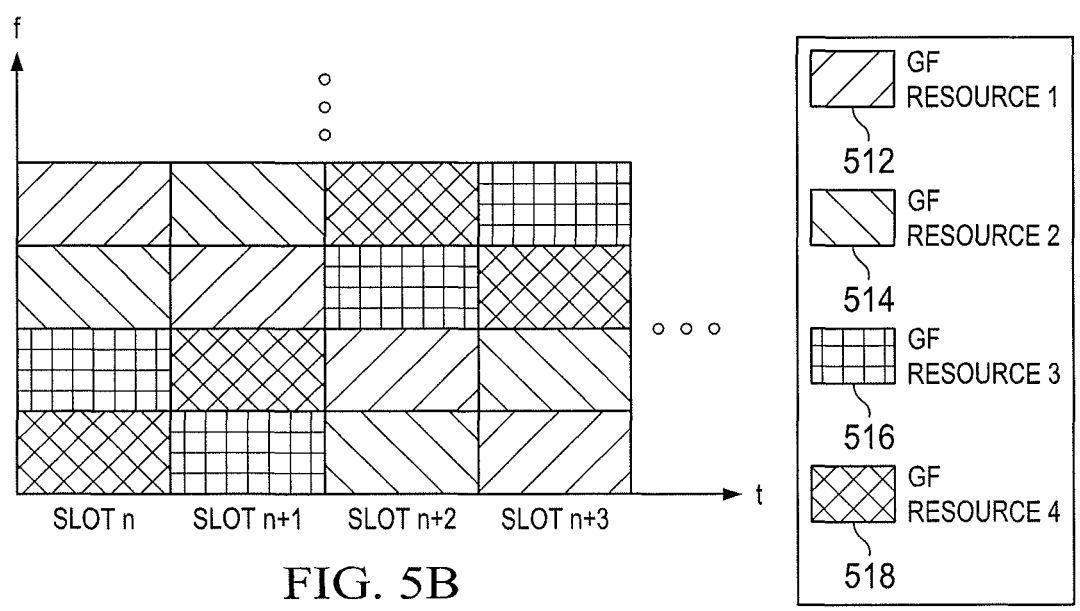
FIG. 5B shows an exemplary embodiment of deactivating one resource configured semi-statically.

If SEMI-STATIC-ACTIVATED=[1, 1, 0, 0] and L1-ACTIVATED=[0, 1, 0, 0], then resource 1 that is semi-statically activated is now dynamically deactivated, leaving only the second resource for transmissions. FIG. 5B illustrates an example of the scenario with hopping patterns defined. In FIG. 5B, a total of 4 sub-bands 512, 514, 516, and 518 are configured semi-statically such as through RRC signaling, but only sub-bands 512 and 514 can be directly used form grant-free transmissions. In the case of light load, the base station (e.g., a gNB) sends DCI to deactivate sub-band 512. After the DCI, only sub-band 514 can be used for grant-free transmissions. Sub-bands 512, 516, and 518 are reserved and cannot be used for grant-free transmissions.

In the case the L1 signaling is only used for activation/deactivation of the semi-static configured resource, the other field in the L1 signaling can be set to a default value such as all "0"s to avoid misunderstanding of the resource information.

It is also possible to change some parameters associated with the resource with the L1 activation/deactivation signaling. In this case, no matter the value of L1-ACTIVATED is, the rest of the field can indicate the resource re-configuration.

For instance, the MCS associated with a resource can be changed with a new value indicated.

The power control parameters can be changed with a new set of values indicated.

The repetition number K can be changed with a new value indicated.

Figure 6A:
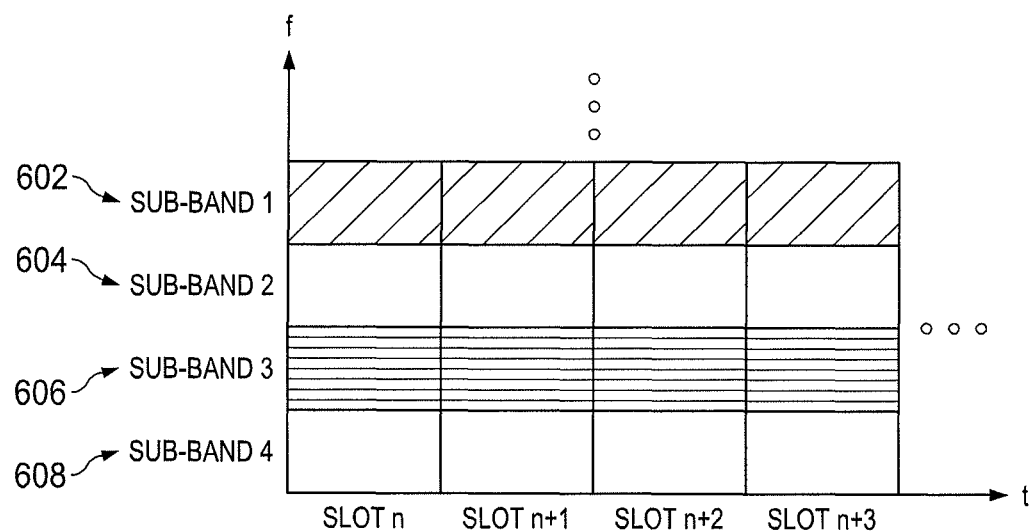
FIG. 6A shows an exemplary embodiment of updating transmit parameters in the third resource.

For example, if L1-ACTIVATED=[1, 0, 1, 0], then resource 1 and resource 3 have been selected for uplink transmissions. In addition, if the information resource allocation field of DCI is exactly same as resource 3, then the transmission configuration of resource 1 takes the default values but the configuration for resource 3 will be updated according to the configuration shown in the DCI. FIG. 6A illustrates an example of the scenario. FIG. 6A shows that 4 GF resources may be jointly configured with no hopping. In FIG. 6A, one GF resource may be 1 sub-band intersecting 1 time slot. In FIG. 6A, a total of 4 sub-bands 602, 604, 606, and 608 are configured semi-statically such as through RRC signaling, but only sub-bands 602 and 606 can be directly used for grant-free transmissions. The base station (e.g., a gNB) sends DCI to update resource configurations in sub-band 606 (e.g., MCS and other parameters). After the DCI, sub-bands 602 and 606 can still be used for grant-free transmissions, but transmissions with sub-band 606 use the updated resource configurations specified in the DCI received by the UE.

Figure 6B:
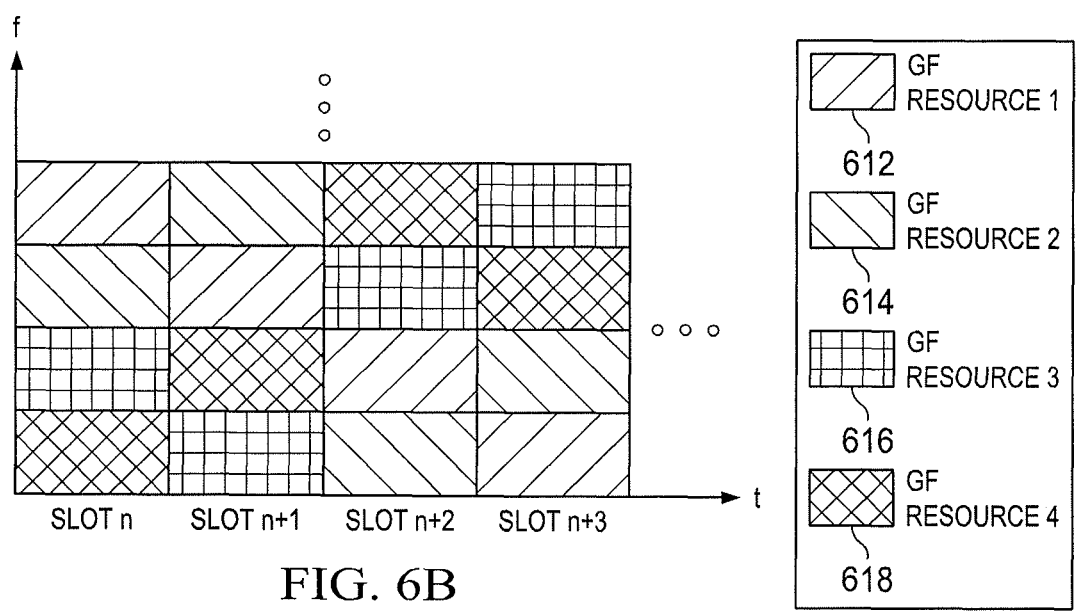
FIG. 6B shows an exemplary embodiment of updating transmit parameters in the second resource.

Similarly, if L1-ACTIVATED=[1, 1, 0, 0], then resource 1 and resource 2 have been selected for uplink transmission. In addition, if the information resource allocation field of DCI is exactly same as resource 2, then the transmission configuration of resource 1 takes the default values but the configuration for resource 2 will be updated according to the configuration shown in the DCI. FIG. 6B illustrates an example of the scenario with hopping patterns defined. In FIG. 6B, a total of 4 sub-bands 612, 614, 616, and 618 are configured semi-statically such as through RRC signaling, but only sub-bands 612 and 614 can be directly used form grant-free transmissions. The base station (e.g., a gNB) sends DCI to update resource configurations in sub-band 614 (e.g., MCS and other parameters). After the DCI, sub-bands 612 and 614 can still be used for grant-free transmissions, but transmissions with sub-band 614 use the updated resource configurations specified in the DCI received by the UE.

In short, since the N resources can be separately activated or deactivated, the changes of parameters can be designed to apply to all of the resources, or to separate resources, respectively.

For the parameters that do not need to be changed, a default value (such as "0") or the original value configured by semi-static configuration can be used to avoid misunderstanding.

It should be noted that the N resources may have different default resource configurations defined in RRC signaling, e.g., MCS, RS, K, power level, hopping pattern.

It should be also noted that the N resources can be jointly activated or deactivated or in RRC signaling while separately be activated or deactivated or reconfigured in L1 signaling. Alternatively, the N resources can be separately activated or deactivated in RRC signaling while jointly be activated or deactivated or reconfigured in L1 signaling. That is, the activation or deactivation in RRC signaling can be decoupled with the activation or deactivation in L1 signaling.

Figure 7:
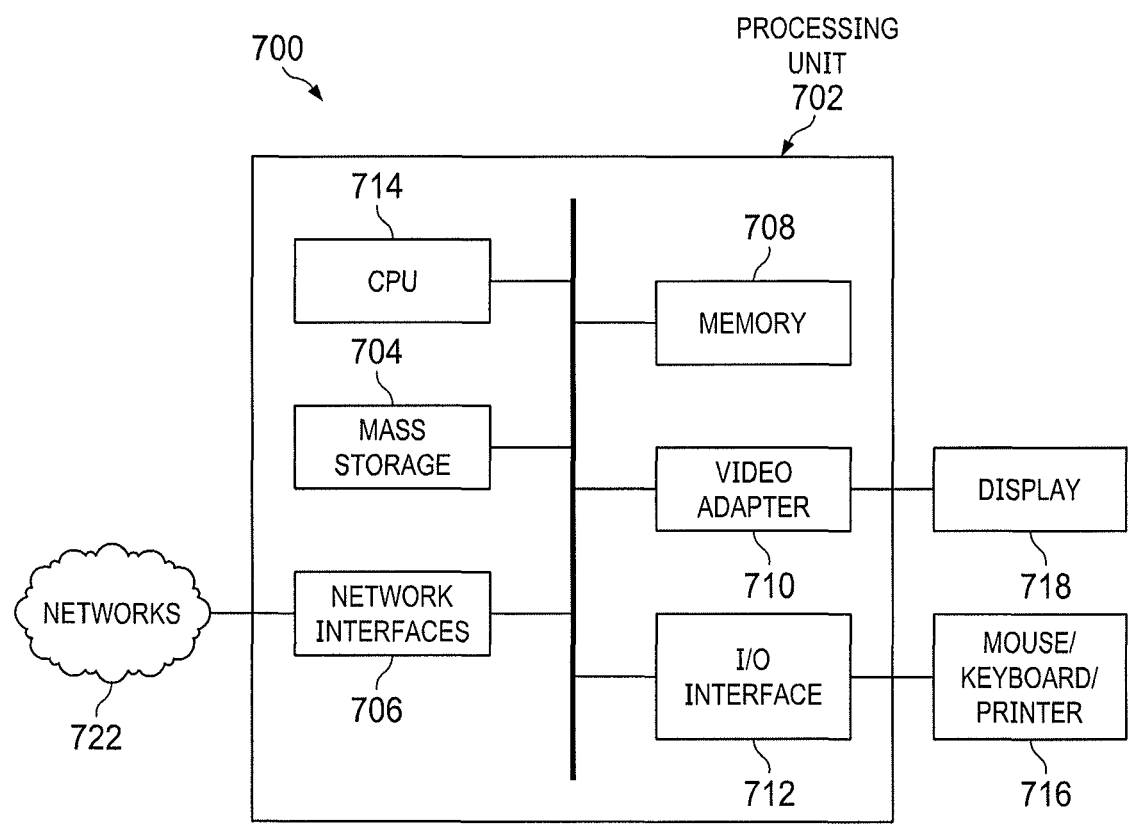
FIG. 7 shows an example of a computing system.

FIG. 7 is a block diagram of a computing system 700 that may be used for implementing the devices and methods disclosed herein. For example, the computing system can be any entity of UE, AN, MM, SM, UPGW, AS, BS, eNodeB, TRP (transmit-receive point), etc. Specific devices may utilize all of the components shown or only a subset of the components, and levels of integration may vary from device to device. Furthermore, a device may contain multiple instances of a component, such as multiple processing units, processors, memories, transmitters, receivers, etc. Such device can be can be any entity of UE, AN, MM, SM, UPGW, AS, BS, eNodeB, TRP (transmit-receive point), etc. The computing system 700 includes a processing unit 702. The processing unit includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

Please note that bus 720 and/or memory 708 may not exist when the processing unit is implemented by hardware, such as using integrated circuits or logic circuits.

Figure 8:
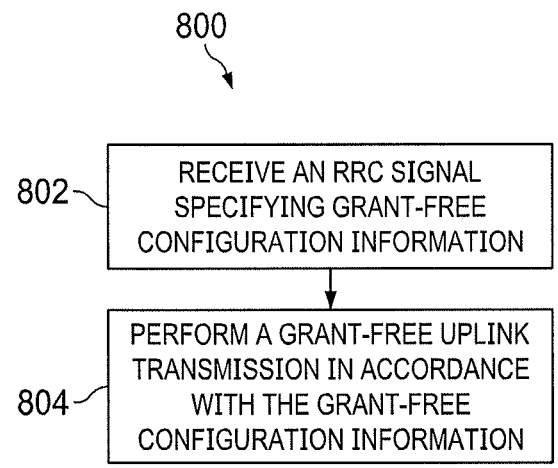
FIG. 8 is a flowchart of an embodiment method for a UE to perform grant-free (GF) uplink (UL) transmissions.

FIG. 8 is a flowchart of an embodiment method 800 for a UE to perform grant-free (GF) uplink (UL) transmissions. At operation 802, the UE may receive a Radio Resource Control (RRC) signal from a base station. The RRC signal may specify GF configuration information. The GF configuration information may comprise an activation field and at least one other GF resource configuration field. The activation field can indicate whether the UE may perform GF UL transmissions without waiting for a downlink control information (DCI) message. At operation 804, the UE may perform a GF UL transmission in accordance with the GF configuration information. The GF UL transmission may be a transmission of a data signal. A data signal is different from a control signal because the data signal may carry payload data from upper layers. In one embodiment, the UE may transmit the data signal in a Physical Uplink Shared Channel (PUSCH) to the base station.

In one embodiment, the activation field in the RRC message is shared with at least a subset of the at least one other GF resource configuration field. For example, the presence or absence of at least a subset of the at least one other GF resource configuration field can indicate whether the UE may perform GF UL transmissions without waiting for the DCI message. In another embodiment, the activation field is a bit field in addition to the at least one other GF resource configuration field.

In some embodiments, when the activation field indicates that the UE may perform the GF UL transmissions without waiting for the DCI message, the UE may perform the GF UL transmission using GF UL resources associated with the at least one other GF resource configuration field in the RRC signal without waiting for the DCI message. When the activation field indicates that the UE needs to wait for the DCI message before performing the GF UL transmissions, the UE waits until the UE receives the DCI message from the base station. The DCI message may comprise additional GF configuration information. Then, the UE may perform the GF UL transmission to the base station in accordance with the GF configuration information in the RRC signal and the additional GF configuration information in the DCI message. The GF configuration information in the RRC signal may comprises at least one of frequency domain resources, time domain resources, at least one reference signal (RS) associated with the time domain resources and frequency domain resources, a modulation and coding scheme (MCS) field, power control fields, a hopping pattern, or a repetition number.

Figure 9:
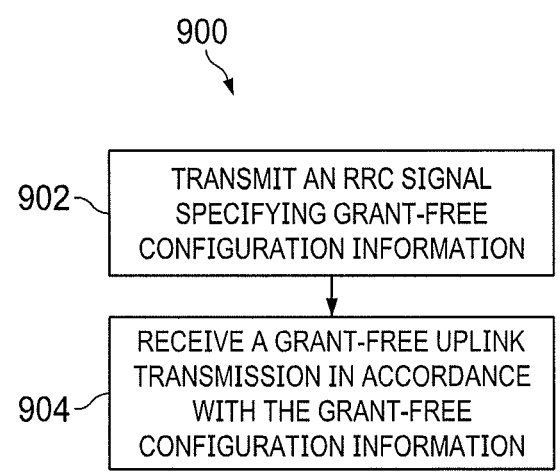
FIG. 9 is a flowchart of an embodiment method for a base station to receive grant-free (GF) uplink (UL) transmissions.

FIG. 9 is a flowchart of an embodiment method 900 for a base station to receive grant-free (GF) uplink (UL) transmissions. At operation 902, the base station may transmit a Radio Resource Control (RRC) signal to a UE. The RRC signal may specify GF configuration information. The GF configuration information may comprise an activation field and at least one other GF resource configuration field. The activation field can indicate whether the UE may perform GF UL transmissions without waiting for a downlink control information (DCI) message. At operation 904, the base station may receive a GF UL transmission in accordance with the GF configuration information. The GF UL transmission may be a transmission of a data signal. A data signal is different from a control signal because the data signal may carry payload data from upper layers. In one embodiment, the base station may receive the data signal in a Physical Uplink Shared Channel (PUSCH) from the UE.

In one embodiment, the activation field in the RRC message is shared with at least a subset of the at least one other GF resource configuration field. For example, the presence or absence of at least a subset of the at least one other GF resource configuration field can indicate whether the UE may perform GF UL transmissions without waiting for the DCI message. In another embodiment, the activation field is a bit field in addition to the at least one other GF resource configuration field.

In some embodiments, when the activation field indicates that the UE may perform the GF UL transmissions without waiting for the DCI message, the base station may receive the GF UL transmission from the UE that uses GF UL resources associated with the at least one other GF resource configuration field in the RRC signal without the base station transmitting the DCI message to the UE. When the activation field indicates that the UE needs to wait for the DCI message before performing the GF UL transmissions, the base station may transmit the DCI message to the UE. The DCI message may comprise additional GF configuration information. Then, the base station may receive the GF UL transmission from the UE in accordance with the GF configuration information in the RRC signal and the additional GF configuration information in the DCI message. The GF configuration information in the RRC signal may comprise at least one of frequency domain resources, time domain resources, at least one reference signal (RS) associated with the time domain resources and frequency domain resources, a modulation and coding scheme (MCS) field, power control fields, a hopping pattern, or a repetition number.

Figure 10:
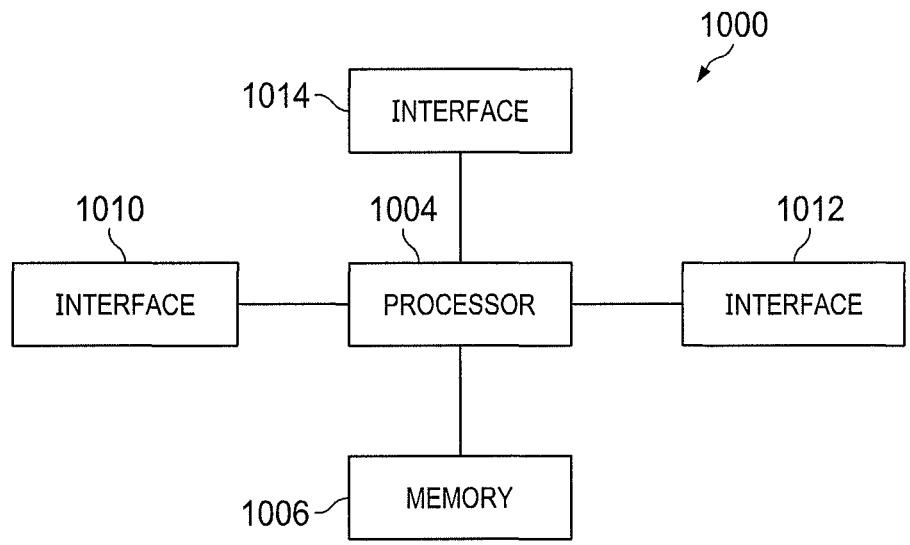
FIG. 10 is a diagram of an embodiment processing system.

FIG. 10 is a block diagram of an embodiment processing system 1000 for performing methods described herein, which may be installed in a host device, such as UEs 100a-c and base stations 170a-b. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
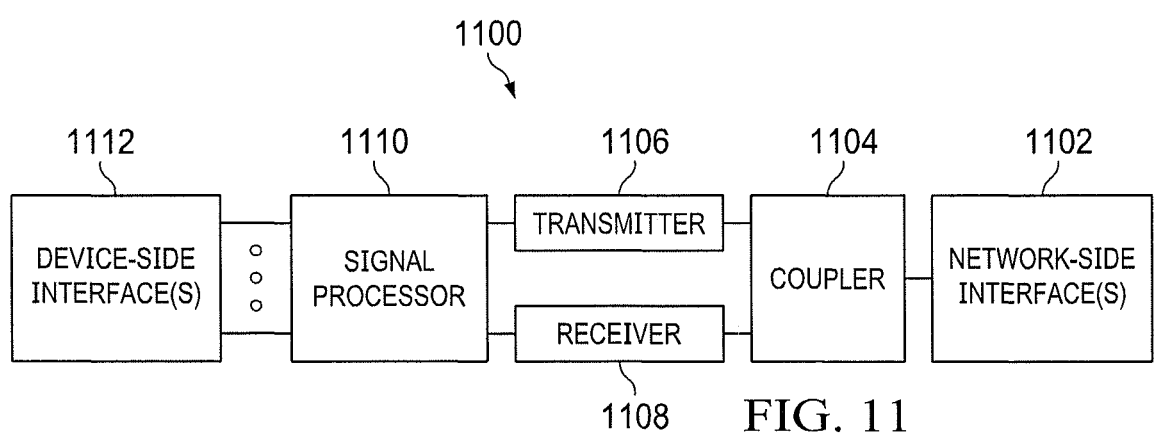
FIG. 11 is a diagram of an embodiment transceiver.

In some embodiments, one or more of the interfaces 1010, 1012, 1014 connects the processing system 1000 to a transceiver adapted to transmit and receive signaling over the telecommunications network. FIG. 11 is a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1100, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module for establishing a serving cluster, an instantiating unit/module, an establishing unit/module for establishing a session link, a maintaining unit/module, or other performing units/modules for performing the above steps. The respective units/modules may be hardware, software, or a combination thereof. For instance, one or more of the units/modules may be an integrated circuit, such as field programmable gate arrays (FPGAs) or application-specific integrated circuits (ASICs).

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, the method comprising:
    transmitting, by a base station to a user equipment (UE), a Radio Resource Control (RRC) signal specifying grant-free (GF) configuration information, the GF configuration information in the RRC signal comprising an activation field and at least one other GF resource configuration field, wherein the activation field in the RRC signal indicates that the UE needs to wait a downlink control information (DCI) message before performing GF uplink (UL) transmissions;
    transmitting, by the base station to the UE, the DCI message, the DCI message comprising additional GF configuration information; and
    receiving, by the base station from the UE, a GF UL transmission in accordance with the GF configuration information in the RRC signal and the additional GF configuration information in the DCI message.

2. The method of claim 1, wherein the activation field is shared with at least a subset of the at least one other GF resource configuration field.

3. The method of claim 1, wherein the activation field is a bit field in addition to the at least one other GF resource configuration field.

4. The method of claim 1, further comprising:
    transmitting, by the base station to the UE, a second RRC signal specifying second GF configuration information, the second GF configuration information in the second RRC signal comprising a second activation field and second at least one other GF resource configuration field, wherein the second activation field indicates that the UE does not need to wait a second DCI message before performing second GF UL transmissions; and
    receiving, by the base station from the UE, a second GF UL transmission using GF UL resources associated with the second at least one other GF resource configuration field in the second RRC signal without transmitting the second DCI message to the UE.

5. The method of claim 1, the GF configuration information in the RRC signal comprises at least one of frequency domain resources, time domain resources, at least one reference signal (RS) associated with the time domain resources and frequency domain resources, a modulation and coding scheme (MCS) field, power control fields, a hopping pattern, or a repetition number.

6. A user equipment (UE), comprising:
   at least one processor; and
   a computer readable storage medium storing programming for execution by the at least one processor, the programming including instructions to:
      receive, from a base station, a Radio Resource Control (RRC) signal specifying grant-free (GF) configuration information, the GF configuration information in the RRC signal comprising an activation field and at least one other GF resource configuration field, wherein the activation field in the RRC signal indicates that the UE needs to wait a downlink control information (DCI) message before performing GF uplink (UL) transmissions;
      receive, from the base station, the DCI message, the DCI message comprising additional GF configuration information; and
      transmit, to the base station, a GF UL transmission in accordance with the GF configuration information in the RRC signal and the additional GF configuration information in the DCI message.

7. The UE of claim 6, wherein the activation field is shared with at least a subset of the at least one other GF resource configuration field.

8. The UE of claim 6, wherein the activation field is a bit field in addition to the at least one other GF resource configuration field.

9. The UE of claim 6, the programming further including instructions to:
   receive, from the base station, a second RRC signal specifying second GF configuration information, the second GF configuration information in the second RRC signal comprising a second activation field and second at least one other GF resource configuration field, wherein the second activation field indicates that the UE does not need to wait a second DCI message before performing second GF UL transmissions; and
   transmit, to the base station, a second GF UL transmission using GF UL resources associated with the second at least one other GF resource configuration field in the second RRC signal without waiting for the second DCI message.

10. The UE of claim 6, the GF configuration information in the RRC signal comprises at least one of frequency domain resources, time domain resources, at least one reference signal (RS) associated with the time domain resources and frequency domain resources, a modulation and coding scheme (MCS) field, power control fields, a hopping pattern, or a repetition number.

11. A base station (BS), comprising:
    at least one processor; and
    a computer readable storage medium storing programming for execution by the at least one processor, the programming including instructions to:
       transmit, to a user equipment (UE), a Radio Resource Control (RRC) signal specifying grant-free (GF) configuration information, the GF configuration information in the RRC signal comprising an activation field and at least one other GF resource configuration field, wherein the activation field in the RRC signal indicates that the UE needs to wait a downlink control information (DCI) message before performing GF uplink (UL) transmissions;
       transmit, to the UE, the DCI message, the DCI message comprising additional GF configuration information; and
       receive, from the UE, a GF UL transmission in accordance with the GF configuration information in the RRC signal and the additional GF configuration information in the DCI message.

12. The BS of claim 11, wherein the activation field is shared with at least a subset of the at least one other GF resource configuration field.

13. The BS of claim 11, wherein the activation field is a bit field in addition to the at least one other GF resource configuration field.

14. The BS of claim 11, the programming further including instructions to:
    transmit, to the UE, a second RRC signal specifying second GF configuration information, the second GF configuration information in the second RRC signal comprising a second activation field and second at least one other GF resource configuration field, wherein the second activation field indicates that the UE does not need to wait a second DCI message before performing second GF UL transmissions; and
    receive, from the UE, a second GF UL transmission using GF UL resources associated with the second at least one other GF resource configuration field in the second RRC signal without transmitting the second DCI message to the UE.

15. The BS of claim 11, the GF configuration information in the RRC signal comprises at least one of frequency domain resources, time domain resources, at least one reference signal (RS) associated with the time domain resources and frequency domain resources, a modulation and coding scheme (MCS) field, power control fields, a hopping pattern, or a repetition number.

* * * * *